April 21, 1931.   C. E. HUFFMAN   1,801,430
OPTICAL SYSTEM
Filed Nov. 7, 1929   2 Sheets-Sheet 1
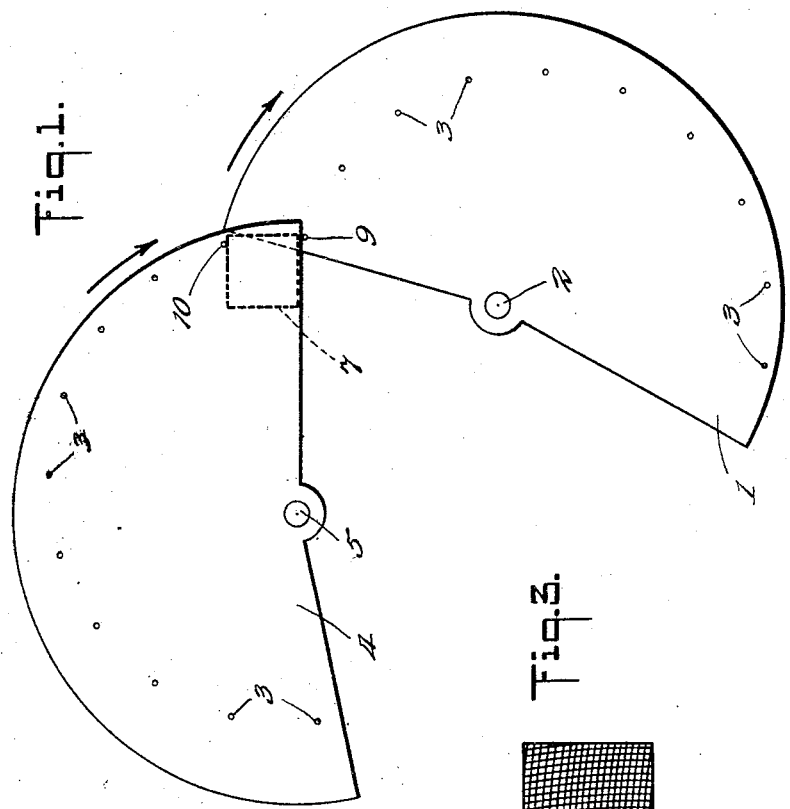
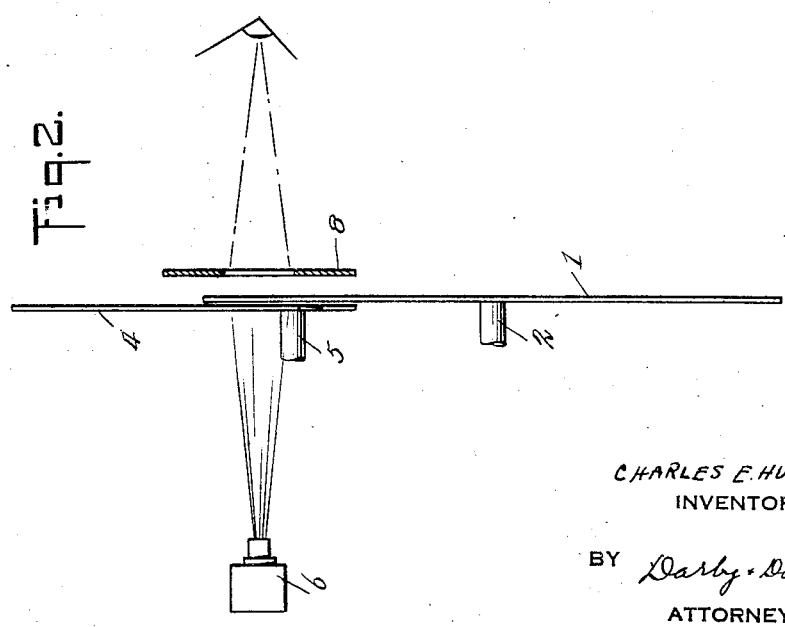

April 21, 1931. C. E. HUFFMAN 1,801,430
OPTICAL SYSTEM
Filed Nov. 7, 1929 2 Sheets-Sheet 2
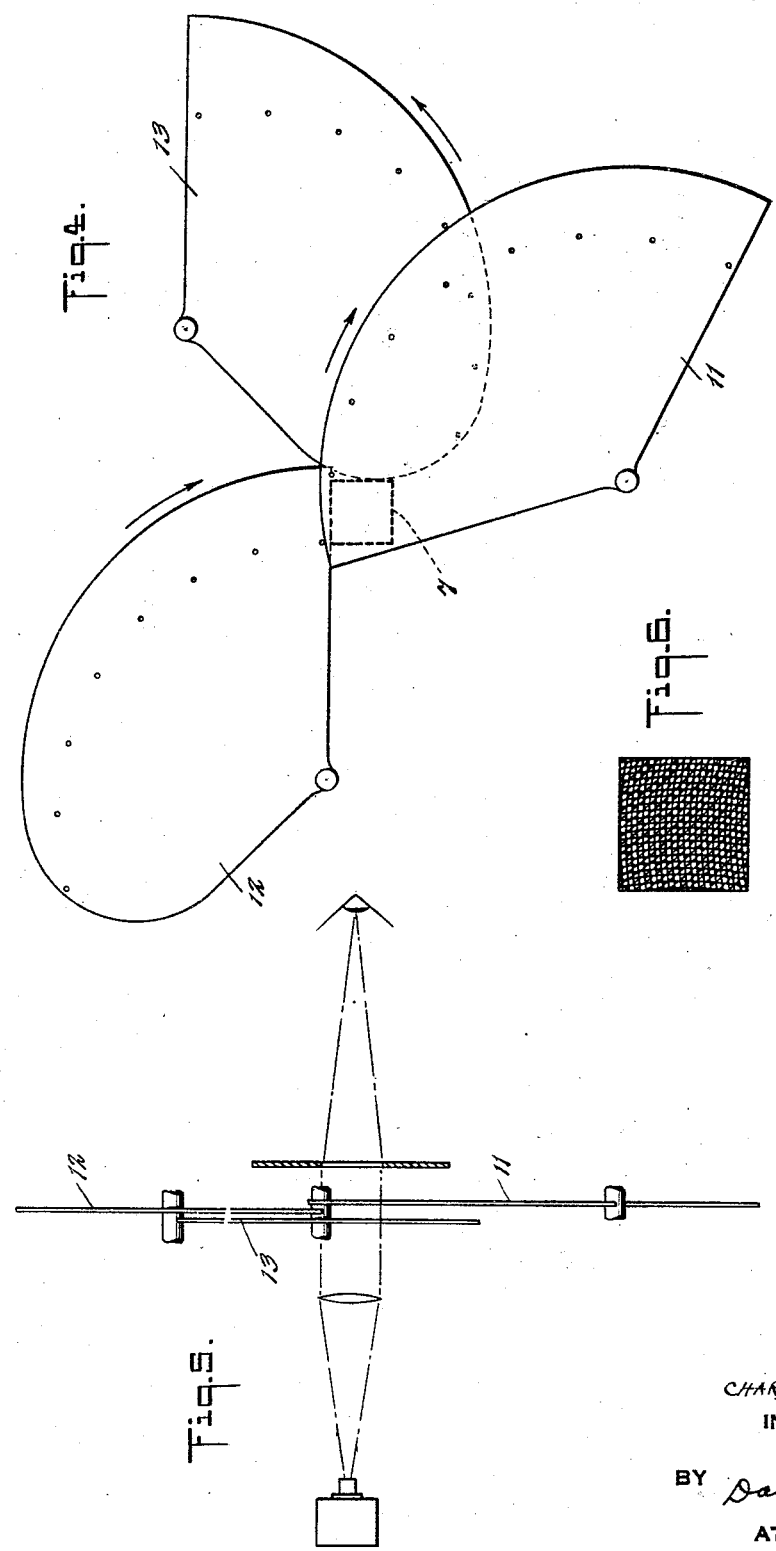
CHARLES E. HUFFMAN
INVENTOR
BY Darby & Darby
ATTORNEY Patented Apr. 21, 1931

1,801,430

UNITED STATES PATENT OFFICE

CHARLES E. HUFFMAN, OF MONTCLAIR, NEW JERSEY, ASSIGNOR TO JENKINS TELEVISION CORPORATION, OF JERSEY CITY, NEW JERSEY, A CORPORATION OF DELAWARE

OPTICAL SYSTEM

Application filed November 7, 1929. Serial No. 405,352.

This invention relates to optical systems, and with particularity to methods and means for scanning in systems of television, picture transmission, etc.

A principal object of the invention is to provide a novel method of scanning an object, image, or visual representation. Heretofore various means have been devised for analyzing an image or visual representation into small or elemental areas. For example in one known type of system the image or representation is analyzed in successive parallel adjacent linear elements by means of a perforated disc, lens disc, or other similar devices. In another type of system the object or image is analyzed in a continuous spiral path.

Accordingly it is a feature of the present invention to provide a method of scanning an image or visual representation, wherein the entire object is first completely scanned over linear elements which extends across the image or representation in one direction, and then is completely scanned over linear elements which extend across the object at an angle to the first linear elements.

A further feature of the invention resides in the method of scanning whereby a more uniform analysis of the image or representation is effected.

A still further feature pertains to a method of scanning an image or visual representation employing a plurality of separate scanning devices, each of which is adapted successively to be brought into effect in scanning the image or representation in different directions.

Other features and advantages of the invention not specifically enumerated will be apparent after a consideration of the following detail description and the appended claim.

While the features of the invention will be pointed out in connection with scanning means for reproducing an image or visual representation, it will be understood that the invention is equally applicable to scanning means for use in analyzing an image or representation preparatory to transmission.

Accordingly Fig. 1 of the drawing shows in a diagrammatic form two devices for scanning in mutually perpendicular directions;

Fig. 2 is a plan view of the mechanism disclosed in Fig. 1;

Fig. 3 represents diagrammatically the combined results of the scannings due to the devices shown in Figs. 1 and 2;

Fig. 4 is a modification of the system disclosed in Fig. 1 employing three analyzing devices for scanning in three different directions;

Fig. 5 is a plan view of the device shown in Fig. 4;

Fig. 6 represents the effects produced by the scanning device of Figs. 4 and 5.

Referring more particularly to Figs. 1 and 2, the numeral 1 represents a circular disc of metal or other suitable material which is adapted to rotate about the axis 2 by any suitable means. Disc 1 is provided with a series of perforations 3 which are successively arranged in the path of a spiral in the well known manner, there being a sufficient number of these perforations to scan the image or representation in the required number of linear elements. For example, if the analysis is to be effected in forty-eight (48) parallel lines, there will be forty-eight (48) perforations 3, spaced apart circumferentially a distance corresponding to one dimension of the image, and each perforation displaced inwardly towards the axis 2 a distance corresponding to the spacing of the linear elements. Mounted to rotate in front of disc 1 is another smaller disc 4 which is adapted to rotate about the axis 5. The disc 4 is provided with perforations 3 in the same manner as disc 1.

Positioned in front of both discs is a reproducing light source 6 which is adapted to have its intensity varied in accordance with image currents. The light from source 6 is projected by any suitable optical means upon the picture field to be scanned by discs 1 and 4, this field being represented in Fig. 1 by the dotted rectangle 7. Positioned on the opposite side of the discs 1 and 4 is an apertured plate 8 having an aperture 9 through which the field 7 may be viewed as shown. As the disc 1 rotates in the direction of the arrow, it will be seen that the field 7 will be illuminated from the source 6 in the form of substantially vertical lines, as shown in Fig. 3. While on the other hand when the disc 4 rotates the field is illuminated in the form of substantially horizontal parallel lines as shown in Fig 3.

In order that the successive scannings may not interfere with each other the discs 1 and 4 are mounted on their respective shafts so that just as the last perforation 9 of disc 1 is leaving the picture field 7, the first perforation 10 of disc 4 is about to enter the field. This position of the discs being shown in Fig. 1. For this latter purpose the discs 1 and 4 may be driven through suitable gearing from the same power source, or if desired separate sources may be employed and the discs maintained in the proper angular relation by any suitable speed control means.

From an inspection of Fig. 3 which shows the picture field as produced with the devices of Figs. 1 and 2, it will be seen that there is apparently less what may be termed design than is the case where the field is reproduced in linear elements extending all in the same direction. Furthermore because of the intersecting relation between the successive scannings there is produced an apparently finer analysis than where the same direction of scanning is maintained throughout.

In order further to increase the apparent fineness of the scannings, and to reduce the effects of design, it may be found advisable to employ more than two scanning devices. For example, as shown in Figs. 4 and 5, the picture field 7 is adapted to be scanned in succession by the scanning devices 11, 12 and 13, each of which is in the form of a sector disc of approximately 120° in circumference. Each of the discs of Fig. 4 is adapted to rotate about its associated axis independently, although the discs are preferably driven from a common source. With the disposition of the disc axes as shown in Fig. 4 the disc 11 will traverse the picture field 7 in the form of successive vertical linear elements, as shown in Fig. 6. Just as the disc 11 is leaving the picture field the disc 12 is entering and continues to scan the field in the form of linear elements at an angle to the preceding linear elements. The combined results of the analysis of the three discs is represented diagrammatically in Fig. 6.

While the invention has been disclosed hereinabove as employing so-called perforated discs for scanning, it will be obvious that any other equivalent scanning device may be employed. Furthermore, while the invention has been disclosed as applied to the image reproducing system, it will be apparent to those familiar with the art that it is equally applicable to a transmitting system in which case the device 6 instead of being a reproducing light source will take the form of a suitable optical system for projecting the image to be transmitted upon the picture field 7, and a suitable light sensitive device will be positioned on the opposite side of the discs in front of the aperture plate 8.

Furthermore while a system employing as many as three discs is disclosed, it will be understood that any greater number of discs may be employed, it being understood of course that the greater the number of discs the faster they will have to be rotated in order that each disc may entirely cover the picture field.

What is claimed is:

In a television system a first scanning device, a second scanning device, a third scanning device, and means for moving each of said devices in succession across a picture field, each device completely scanning the subject or object in lines that mutually intersect.

In testimony whereof I have hereunto set my hand on this 4th day of November, A. D. 1929.

CHARLES E. HUFFMAN.